United States Patent
Evans et al.

(10) Patent No.: US 10,674,480 B1
(45) Date of Patent: Jun. 2, 2020

(54) DEVICES, SYSTEMS, AND METHODS FOR PREDICTING COMMUNICATION CHANNEL CONDITIONS

(71) Applicant: Cypress Semiconductor Corporation, San Jose, CA (US)

(72) Inventors: Bradley Evans, Northville, MI (US); Nicholas Stopher, Novi, MI (US)

(73) Assignee: Cypress Semiconductor Corporation, San Jose, CA (US)

( * ) Notice: Subject to any disclaimer, the term of this patent is extended or adjusted under 35 U.S.C. 154(b) by 0 days.

(21) Appl. No.: 16/580,230

(22) Filed: Sep. 24, 2019

Related U.S. Application Data

(60) Provisional application No. 62/841,747, filed on May 1, 2019.

(51) Int. Cl.
| | |
|---|---|
| H04W 72/02 | (2009.01) |
| H04W 4/029 | (2018.01) |
| H04W 4/40 | (2018.01) |
| H04W 24/04 | (2009.01) |
| H04W 64/00 | (2009.01) |
| H04W 72/04 | (2009.01) |
| H04W 24/10 | (2009.01) |
| H04W 84/12 | (2009.01) |
| H04W 88/02 | (2009.01) |

(52) U.S. Cl.
CPC ........... H04W 72/02 (2013.01); H04W 4/029 (2018.02); H04W 4/40 (2018.02); H04W 24/04 (2013.01); H04W 24/10 (2013.01); H04W 64/006 (2013.01); H04W 72/0453 (2013.01); H04W 84/12 (2013.01); H04W 88/02 (2013.01)

(58) Field of Classification Search
CPC . H04W 72/02; H04W 72/0453; H04W 4/029; H04W 24/10; H04W 64/006
See application file for complete search history.

(56) References Cited

U.S. PATENT DOCUMENTS

| | | | |
|---|---|---|---|
| 8,233,389 | B2 | 7/2012 | Yim et al. |
| 8,559,955 | B2 | 10/2013 | Handforth et al. |
| 8,908,516 | B2 | 12/2014 | Tzamaloukas et al. |
| 10,039,064 | B1 | 7/2018 | Gibbons |
| 10,243,604 | B2 | 3/2019 | Ross et al. |
| 10,299,106 | B1 | 5/2019 | Cooper |

(Continued)

OTHER PUBLICATIONS

Behrad Toghi, et al., "Analysis of Distributed Congestion Control in Cellular Vehicle-to-everything Networks", Connected and Autonomous Vehicle Research Lab, University of Central Florida, Jun. 25, 2019; 7 pages.

(Continued)

*Primary Examiner* — Walli Z Butt
*Assistant Examiner* — Ryan C Kavleski

(57) ABSTRACT

An example device tracks geographical location of the wireless device and time associated with the wireless device. The device may access channel map data comprising a predicted channel condition value for each of a plurality of Wi-Fi channels within each of a plurality of geographical locations during a plurality of time periods of day. The device can use the channel map data to select one of the plurality of Wi-Fi channels for communication based on a geographical location of the wireless device and a time of day associated with the wireless device.

16 Claims, 11 Drawing Sheets

(56) References Cited

U.S. PATENT DOCUMENTS

| | | | |
|---|---|---|---|
| 2008/0051100 A1* | 2/2008 | Kruys | H04W 48/18 455/456.1 |
| 2014/0199990 A1* | 7/2014 | Wolcott | H04H 20/77 455/422.1 |
| 2015/0172863 A1* | 6/2015 | Brachet | G01S 5/0236 455/456.1 |
| 2017/0325210 A1* | 11/2017 | Green | H04W 72/0453 |
| 2018/0102961 A1* | 4/2018 | Emmanuel | H04W 28/04 |
| 2018/0295533 A1 | 10/2018 | Scherzer et al. | |
| 2018/0302338 A1 | 10/2018 | Yousefi et al. | |
| 2018/0343596 A1 | 11/2018 | Soro | |
| 2019/0020985 A1 | 1/2019 | Dai et al. | |
| 2019/0190980 A1 | 6/2019 | Penilla et al. | |

OTHER PUBLICATIONS

Le Liang, "Towards Intelligent Vehicular Networks: A Machine Learning Framework", IEEE Journal, Jun. 10, 2019; 12 pages.

\* cited by examiner

| GEO-LOC. 502 | TPOD 504 | CONDITION VALUE PER CHANNEL 506 ||||||||||||
|---|---|---|---|---|---|---|---|---|---|---|---|---|---|
| | | 1 | 2 | 3 | 4 | 5 | 6 | 7 | 8 | 9 | 10 | 11 | 12 | 13 |
| Z1 | 4-8am | 5 | 3 | 0 | 2 | 3 | 5 | 2 | 0 | 0 | 1 | 5 | 0 | 0 |
| | 8-12pm | 5 | 3 | 0 | 1 | 1 | 5 | 3 | 3 | 4 | 5 | 5 | 2 | 0 |
| | 12-4pm | 5 | 0 | 0 | 0 | 1 | 5 | 1 | 0 | 2 | 1 | 5 | 0 | 1 |
| | 4-8pm | 5 | 2 | 1 | 3 | 4 | 5 | 1 | 0 | 0 | 0 | 5 | 3 | 1 |
| | 8-12am | 3 | 3 | 1 | 1 | 1 | 3 | 3 | 2 | 4 | 1 | 3 | 0 | 3 |
| | 12-4am | 2 | 0 | 1 | 3 | 1 | 2 | 2 | 1 | 2 | 1 | 2 | 1 | 1 |
| | | 1 | 2 | 3 | 4 | 5 | 6 | 7 | 8 | 9 | 10 | 11 | 12 | 13 |
| Z2 | 4-8am | 1 | 4 | 5 | 5 | 3 | 3 | 1 | 4 | 2 | 5 | 4 | 1 | 4 |
| | 8-12pm | 1 | 0 | 3 | 3 | 2 | 3 | 2 | 1 | 2 | 1 | 4 | 1 | 5 |
| | 12-4pm | 5 | 5 | 1 | 2 | 5 | 5 | 1 | 4 | 0 | 5 | 4 | 1 | 2 |
| | 4-8pm | 5 | 2 | 2 | 4 | 4 | 5 | 0 | 3 | 0 | 2 | 3 | 1 | 1 |
| | 8-12am | 1 | 1 | 4 | 2 | 5 | 5 | 0 | 1 | 0 | 0 | 5 | 1 | 2 |
| | 12-4am | 2 | 1 | 0 | 0 | 3 | 4 | 1 | 0 | 2 | 2 | 5 | 5 | 0 |
| | | 1 | 2 | 3 | 4 | 5 | 6 | 7 | 8 | 9 | 10 | 11 | 12 | 13 |
| Z3 | 4-8am | 5 | 1 | 0 | 5 | 2 | 3 | 5 | 1 | 2 | 0 | 0 | 0 | 1 |
| | 8-12pm | 5 | 4 | 1 | 5 | 0 | 4 | 2 | 2 | 2 | 2 | 5 | 5 | 0 |
| | 12-4pm | 4 | 5 | 0 | 2 | 5 | 5 | 5 | 1 | 1 | 1 | 5 | 3 | 0 |
| | 4-8pm | 3 | 4 | 0 | 0 | 4 | 5 | 3 | 2 | 1 | 1 | 5 | 3 | 3 |
| | 8-12am | 2 | 3 | 3 | 3 | 1 | 5 | 5 | 2 | 2 | 4 | 5 | 3 | 5 |
| | 12-4am | 1 | 5 | 4 | 0 | 2 | 5 | 4 | 5 | 5 | 1 | 0 | 3 | 4 |
| | | 1 | 2 | 3 | 4 | 5 | 6 | 7 | 8 | 9 | 10 | 11 | 12 | 13 |
| Z4 | 4-8am | 3 | 1 | 5 | 1 | 5 | 5 | 3 | 0 | 1 | 0 | 1 | 1 | 0 |
| | 8-12pm | 5 | 4 | 1 | 0 | 2 | 5 | 0 | 0 | 2 | 0 | 3 | 3 | 0 |
| | 12-4pm | 5 | 2 | 2 | 0 | 1 | 5 | 1 | 0 | 3 | 0 | 5 | 5 | 2 |
| | 4-8pm | 5 | 5 | 3 | 2 | 5 | 5 | 4 | 1 | 2 | 5 | 5 | 0 | 5 |
| | 8-12am | 4 | 5 | 4 | 0 | 3 | 5 | 0 | 1 | 1 | 3 | 1 | 5 | 3 |
| | 12-4am | 2 | 5 | 2 | 1 | 4 | 4 | 1 | 1 | 3 | 3 | 2 | 1 | 3 |

DEVICES, SYSTEMS, AND METHODS FOR PREDICTING COMMUNICATION CHANNEL CONDITIONS

RELATED APPLICATIONS

This application claims the priority benefit of U.S. Provisional Application No. 62/841,747 filed May 1, 2019, which is incorporated herein by reference in its entirety.

TECHNICAL FIELD

The subject matter relates to the field of wireless communications. More specifically, but not by way of limitation, the subject matter discloses techniques for channel selection based on predicted communication channel conditions.

BACKGROUND

With the proliferation of the Internet of Things (IoT), the number of wireless devices, networks, and network traffic (e.g., in the 2.4 GHz and 5 Ghz frequency bands) are steadily increasing. The resulting increases in network interference and congestion are harming network performance, for example, by causing decreased throughput and increased latency, among wireless devices operating within geographical locations.

BRIEF DESCRIPTION OF THE DRAWINGS

Some embodiments are illustrated by way of example and not limitation in the figures of the accompanying drawings in which:

FIG. 5 is a chart diagram showing a channel condition value per channel, in accordance with an embodiment;

DETAILED DESCRIPTION

Figure 1:
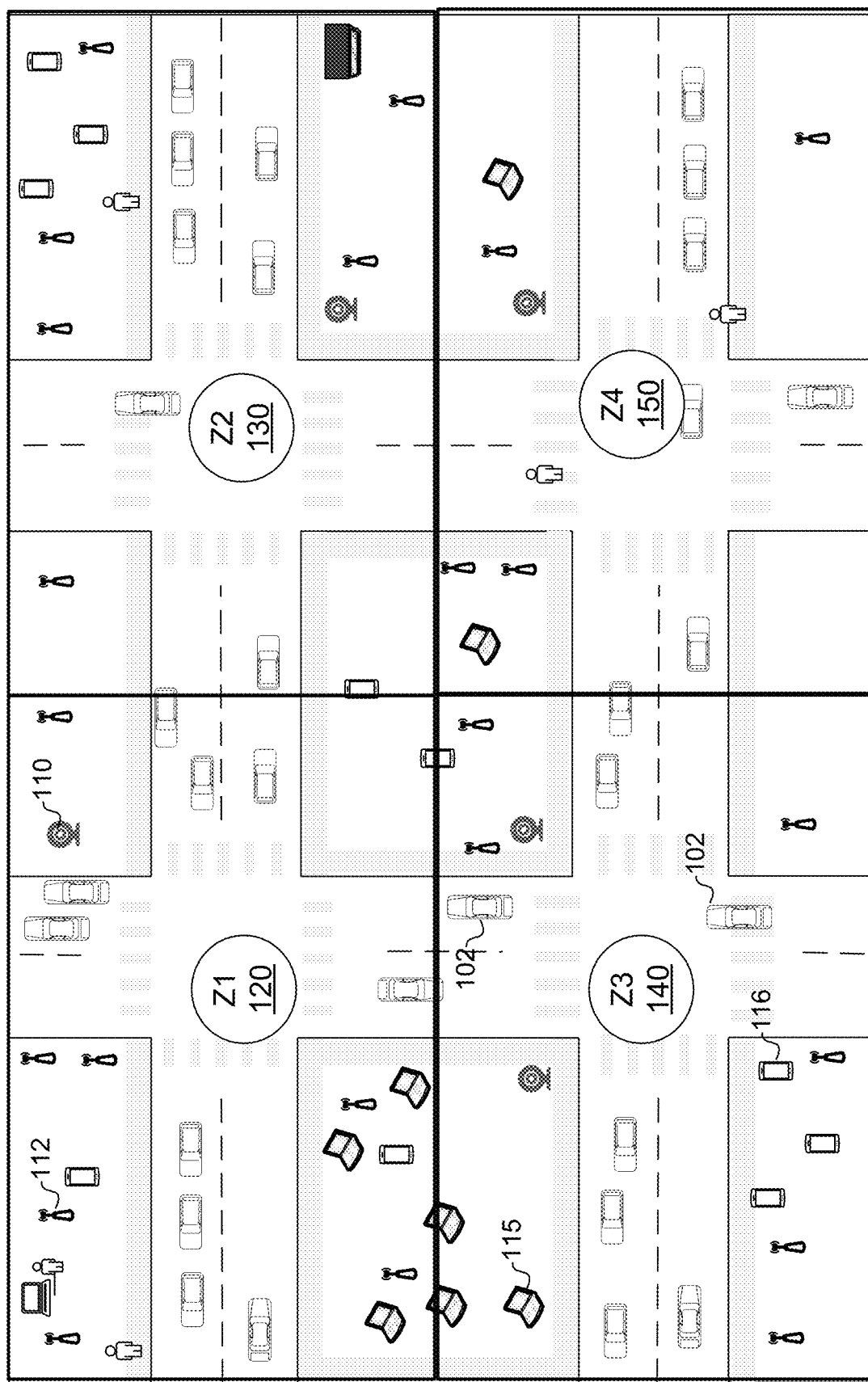
FIG. 1 is a map diagram illustrating wireless devices in geographical zones, in accordance with embodiments.

Devices, systems, and methods for predicting communication channel conditions are described. In the following description, for purposes of explanation, numerous examples and embodiments are set forth in order to provide a thorough understanding of the claimed subject matter. It will be evident to one skilled in the art that the claimed subject matter may be practiced in other embodiments. Some embodiments are now briefly introduced and then discussed in more detail along with other embodiments beginning with FIG. 1.

Various factors can impact the condition of wireless communication channels being used for communication, for example, according to Wireless Local Area Network (WLAN) communication protocol (e.g., Wi-Fi based on IEEE 802.11 standards), Bluetooth (BT) communication protocol (e.g., based on BT SIG standards), and/or Zigbee (ZB) communication protocol (e.g., based on IEEE 802.15.4 standards) in the 2.4 GHz and/or 5 Ghz frequency bands. The factors that impact channel conditions can change with time and may include, without limitation, number of wireless devices in use, frequency spectrums in use, channels in use, overall traffic, and/or the level of compliance with communication protocols. The presence of other common radio frequency (RF) emissions from microwave ovens, cordless phones, and baby monitors in the 2.4 GHz frequency band and/or radar signals in the 5 GHz band can also affect channel conditions.

Channel conditions such as channel congestion and channel interference can increase communication interruptions experienced by wireless devices operating within the same vicinity. Channel congestion occurs when bandwidth associated with a node and/or a link is insufficient and network data traffic exceeds capacity, deteriorating network service quality. For example, network channel congestion may result in queuing delay, frame or data packet loss, and the blocking of new connections. Channel interference may include adjacent and/or co-channel interference. For example, interfering RF signals in an adjacent channel of an overlapping frequency spectrum (e.g., WLAN, BT, and ZB in 2.4 GHz range) and/or in an adjacent frequency spectrum (e.g., cellular such as Long-Term Evolution (LTE) band 7 and band 40) relative to the wanted RF signals can cause frequency, intermodulation and/or harmonic interference. Since decoding errors can hinder successful re-assembly of packets encoded in the wanted RF signals, these interfering RF signals can significantly increase packet loss.

The presence of mobile networks can also affect channel conditions. A mobile network includes a network of two or more network devices, where at least one of the network devices can move among geographical locations. In some embodiments (e.g., in a vehicle), more than one of the network devices may move, together or separately, among geographical locations. For example, a mobile network within an automobile may cause and/or experience varying channel conditions as the automobile (e.g., and the mobile network) moves through different geographical locations. In some cases, the presence of a number of mobile networks (e.g., during "rush hour") and/or other wireless network factors can negatively impact channel conditions. Due to such channel conditions, packet errors may increase on certain channels causing, for example, interruption in communication and increased power consumption (e.g., associated with packet retransmission) by a number of wireless devices in the surrounding area. Thus, channel conditions may dictate which communication channels are suitable for communication within a geographical location.

Conventional wireless devices do not employ any techniques to proactively utilize location and time-based channel condition predictions to avoid service interruptions. Devices, systems, and methods described herein generate channel map data for geographical locations over different time periods of day and use the channel map data to avoid or mitigate the effects of predicted harmful channel conditions. As will be described, channel condition data corresponding to various geographical locations and times can be collected by as few as one wireless device or crowdsourced by multiple wireless devices. In an embodiment, the channel condition data is aggregated to populate a channel map that provides a channel condition value for each channel detected within each geographical location, during each period of time. In one embodiment, a cloud-based system generates the channel map data using channel condition data crowdsourced by hundreds or thousands of wireless devices. Alternatively, a wireless device may build its own channel map data with or without the benefit of crowdsourcing. In embodiments, one or more wireless devices (e.g., in an automobile) can access the channel map data to avoid or mitigate against harmful channel conditions predicted by the channel map data for a location and time. Although embodiments are described with respect to WLAN channels within the 2.4 GHz frequency band it will be noted that the techniques described herein are equally applicable to channels within the 5 GHz and 6 GHz frequency bands as well as any other wireless communication that may suffer from channel conditions such as congestion and/or interference.

In one embodiment, a cloud-based electronic device including a channel map data generator receives first channel condition data and second channel condition data. The first channel condition data is associated with first Wi-Fi channels detected within a first geographical location during a first time period of day while the second channel condition data is associated with second Wi-Fi channels detected within the first geographical location during a second time period of day. The channel map data generator uses the first channel condition data to generate a first channel condition value for each of the first Wi-Fi channels detected within the first geographical location during the first time period of day and uses the second channel condition data to generate a second channel condition value for each of the second Wi-Fi channels detected within the first geographical location during the second time period of day. The cloud-based electronic device can then transmit the channel map data to a wireless device for its use in a channel selection operation to avoid or mitigate a harmful channel condition. As will be described, channel condition values for additional time periods of day and/or additional geographical locations can be generated in a similar manner to build out more extensive predictive channel maps.

In another embodiment, a wireless device (e.g., a mobile phone or a vehicle infotainment system) includes a location tracker to track geographical location of the wireless device and a time tracker to track a time of day associated with the wireless device. A memory system of the wireless device stores channel map data including a predicted channel condition value for each of a plurality of Wi-Fi channels within each of a plurality of geographical locations during a plurality of time periods of day. In embodiments, a channel condition evaluator of the wireless device uses the channel map data to avoid or mitigate a harmful channel condition predicted by the channel map data, based on a geographical location of the wireless device and a time of day associated with the wireless device. Avoiding or mitigating the predicted channel condition may be initiated prior to entering a geographical location and may include without limitation, adjusting a transmit power, adjusting channel width used for communication, and switching to a different channel for communication.

Unlike conventional techniques, embodiments described herein can anticipate harmful channel conditions expected at a geographical location during a time period and take corrective action to avoid the extent of interruptions in communication and the power consumption that would otherwise be caused by the harmful channel conditions.

The detailed description below includes references to the accompanying drawings, which form a part of the detailed description. The drawings show illustrations in accordance with embodiments. These embodiments, which are also referred to herein as "examples," are described in enough detail to enable those skilled in the art to practice embodiments of the claimed subject matter. The embodiments may be combined, other embodiments may be utilized, or structural, logical, and electrical changes may be made without departing from the scope of what is claimed. The following detailed description is, therefore, not to be taken in a limiting sense, and the scope is defined by the appended claims and their equivalents.

FIG. 1 is a map diagram illustrating wireless devices in geographical zones, in accordance with embodiments. As introduced above, network use, and consequently channel conditions in a geographical location, can change depending on various factors and/or time periods. As used herein, a network means two or more devices that are connected over a medium and configured to communicate with one another using a communication protocol. A network channel refers to a portion of the network medium used for communication. Channel conditions refers to the suitability of the channel to support communication.

The map is shown to include zone 1 (Z1) 120, zone 2 (Z2) 130, zone 3 (Z3) 140, and zone 4 (Z4) 150. During any given time period, each zone may have any number of wireless devices or other RF emitters operating and generating wireless traffic within its boundaries. Although the zones are shown to be similarly sized, each zone may be of any size or sized differently from other zones without departing from the claimed subject matter. In embodiments, each zone is considered a geographical location or area and may be defined by a set of multiple location coordinates (e.g., GPS coordinates) or by as few as one location coordinate (e.g., landmark status).

Example wireless devices may include wireless cameras (e.g., the wireless camera 110), mobile phones (e.g., the mobile phone 116), access points (e.g., the access point 112), laptop computers (PCs) (e.g., the laptop 115), automobiles (e.g., the automobile 102), wireless sensors (not shown), and/or any other IoT device.

In embodiments, channel conditions in Z1 120, Z2 130, Z3 140, and Z4 150 can be affected by network use that corresponds to patterns of business hours of operation, commute periods, automobile traffic, or any other pattern corresponding wireless traffic. Channel urination (e.g., over-occupation) by a wireless device that is not compliant with the WLAN standard protocol may also affect channel conditions.

Figure 2:
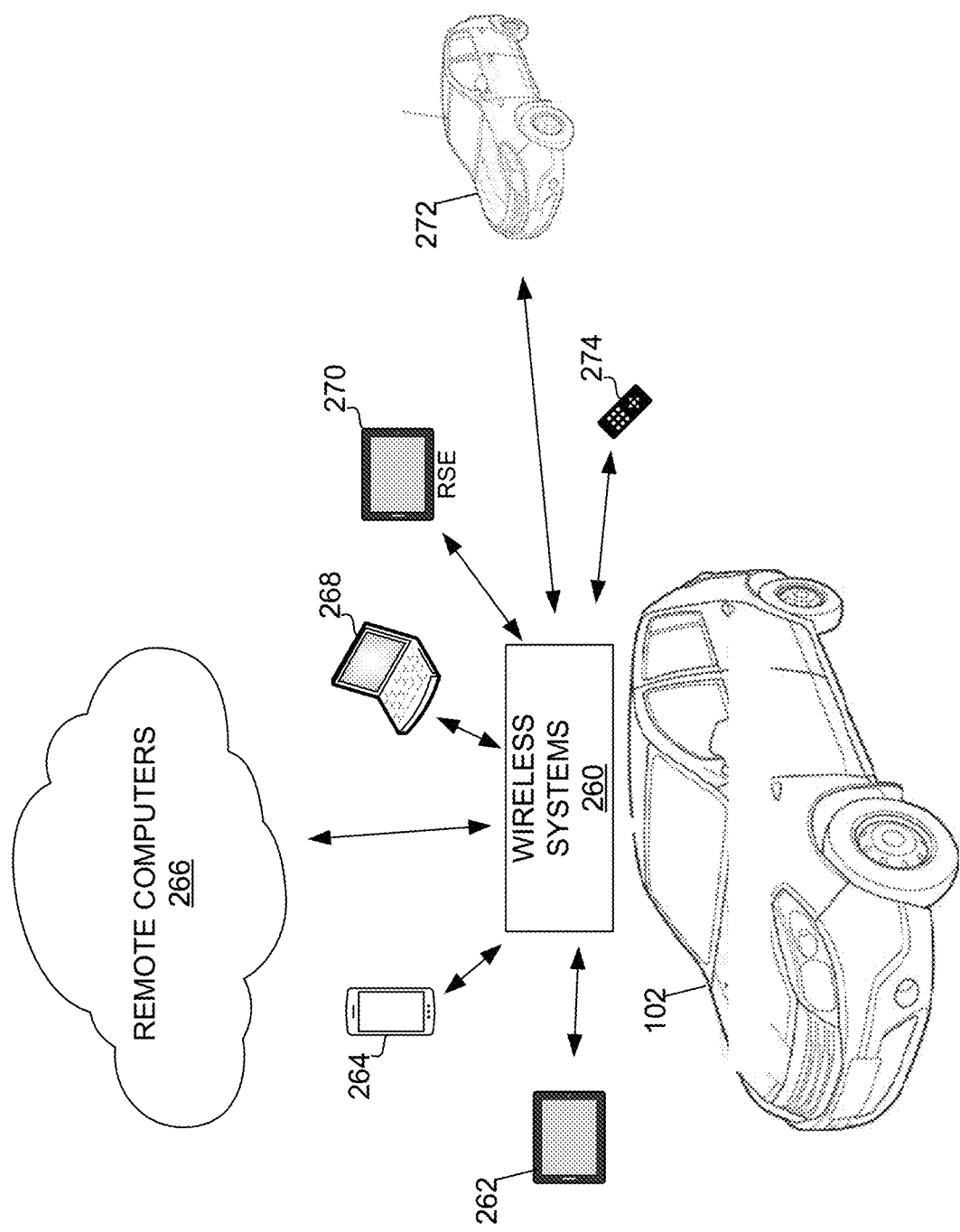
FIG. 2 is a network diagram illustrating various networks that may be associated with an automobile, in accordance with embodiments.

FIG. 2 is a network diagram illustrating various networks that may be associated with an automobile, in accordance with embodiments. The wireless systems 260 facilitate wireless communication with and among wireless devices associated with the automobile 102. The wireless devices associated with the automobile 102 may include, without limitation, console display 262, mobile phone 264, laptop computer 268, rear seat entertainment (RSE) 270, remote computers 266, other automobile 272, and remote control 274. In embodiments, wireless systems 260 may include an infotainment head unit capable of communicating via Wi-Fi, Bluetooth, and LTE communication protocols with one or more of the wireless devices.

Example wireless communication by and among the wireless devices facilitated by the wireless systems 260 via Wi-Fi may include display sharing, multimedia distribution (e.g., to RSE), Internet access (e.g., tethering, external hotspots), and EV wireless charging. The wireless systems 260 may use 802.11p for car to car communication. Example wireless communication by and among wireless devices facilitated by the wireless systems 260 via Bluetooth may include hands free voice, media streaming, keyless entry, automated parking, tire pressure monitoring, and remote sensor controls. The wireless systems 260 may use LTE for data connections to offload media services and for OEM over the air updates. It will be noted that communication for the various functionality described above may be achieved using other communication protocols without departing from the claimed subject matter. One or more of the mobile networks (e.g., automotive network) in the automobile 102 may be susceptible to channel conditions in a geographical location. A channel map data generator to build a database of predicted communication channel conditions for a geographical zone is described with respect to FIG. 3.

Figure 3:
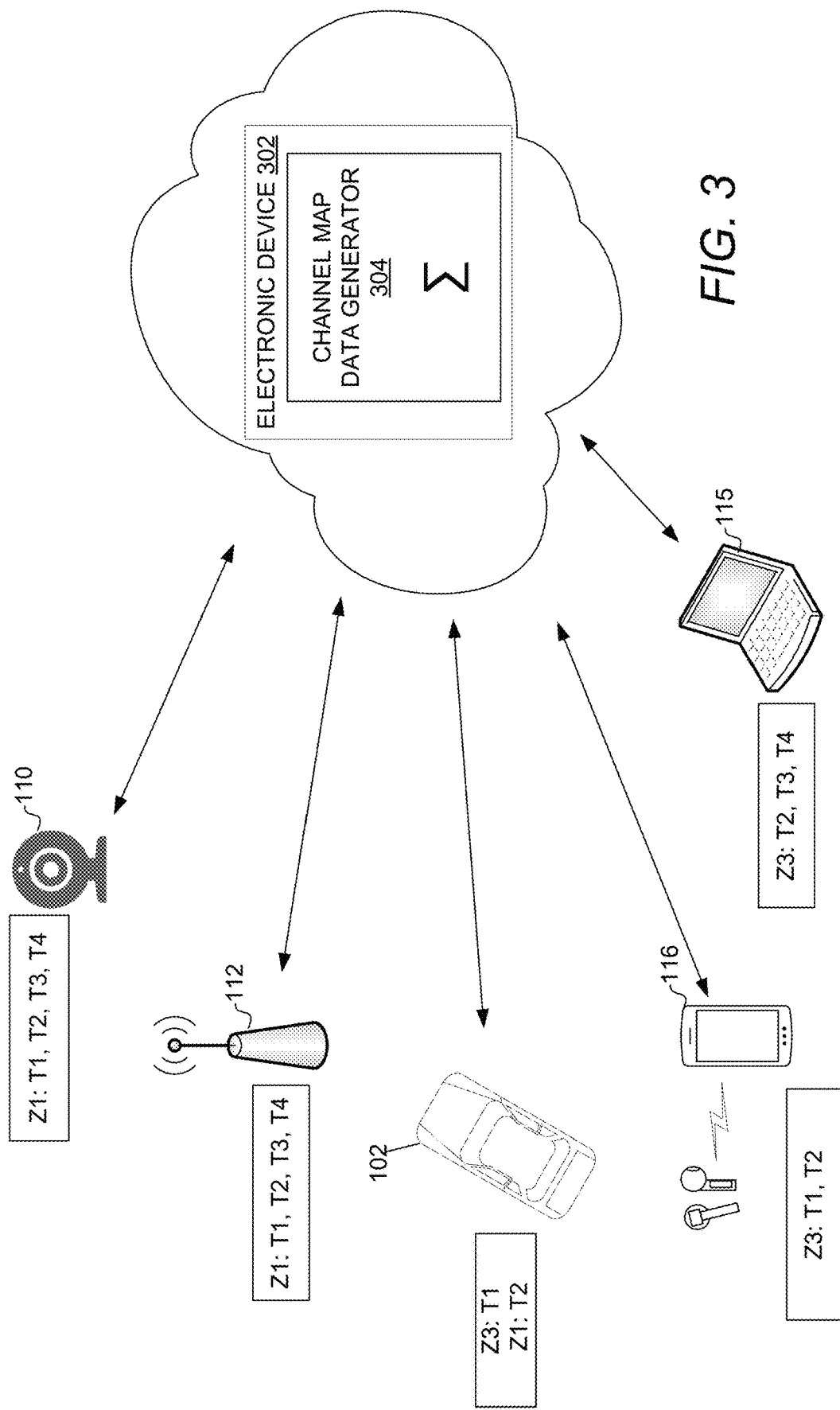
FIG. 3 is a network diagram illustrating wireless devices coupled to an electronic device including a channel map data generator, in accordance with an embodiment.

FIG. 3 is a network diagram illustrating wireless devices coupled to an electronic device including a channel map data generator, in accordance with an embodiment. In embodiments, one or more of the wireless devices report up geo-tagged and time stamped channel condition data associated with different geographical zones at different time periods of day. For example, the wireless camera 110 and the access point 112 may report channel condition data associated with Z1 120 at times T1, T2, T3, and T4; the automobile 102 may report channel condition data associated with Z3 140 at T1 and Z1 120 at T2; the mobile phone 116 may report channel condition data associated with Z3 140 at T1 and T2; and the laptop computer 115 may report channel condition data associated with Z3 140 at T1, T2, T3, and T4. The types of wireless devices that can collect channel condition data are not limited to those shown in FIG. 1 or FIG. 3. For example, wireless devices may include RF spectrum analysis devices such as RF collection boxes (not shown) or drones (not shown) that are fixed in location or that can move to patrol locations of interest. In embodiments, the channel map data generator 304 can generate channel map data based on the crowdsourced channel condition data provided by the wireless devices from the various locations and times. The electronic device 302 may distribute the channel map data to one or more of the wireless devices so that a wireless device may avoid or mitigate interference or congestion predicted by the channel map data. Alternatively or additionally the electronic device 302 may act as a central control node using the channel map data to remotely tune parameters (e.g., transmit power, channel, throughput) of one or more of the wireless devices to balance load and bandwidth in a wireless ecosystem. It will be noted that a wireless device need not provide channel condition data in order to benefit from the channel map data generated by the electronic device. Conversely, a wireless device may contribute channel condition data but receive no benefit from the channel map data.

Channel condition data can include any RF related information that may be used to determine, infer, or predict a condition of a communication channel. Example channel condition data may include, without limitation, identification of channels in use, received signal strength indicators (RSSI), transmit opportunity values, access to the medium values, number of packets, packet error values, retransmit values, throughput values, latency values, bandwidth values, spectrum in use by ground-based radar (e.g., DFS channel use in 5 GHz), MAC address, SSID, and/or manufacturer, etc. In some embodiments, the electronic device 302 may organize channel condition data and/or other information collected from wireless device so that it may be used for purposes other than managing channel conditions. For example, the electronic device 302 may generate time-dependent map data representing MAC addresses, SSID, network types, and/or device manufacturers which may provide monetizable market intelligence regarding devices or protocols that are in use in geographical locations at different times (e.g. indicating levels of market penetration).

In embodiments, the channel map data generator 304 organizes the geo-tagged and time-stamped congestion data and aggregates it by channel, location, and time period of day. The congestion map data generator may aggregate the channel condition data to generate channel condition values based on the following expression:

$$\sum_{n=1}^{n_{end}} \int_{t=0}^{t_{end}} x_n(t)dt \quad (1)$$

where n=1 is a first wireless device reporting channel condition data and $n_{end}$ is a last wireless device reporting channel condition data, t=0 is a start of a time period and $t_{end}$ is the end of the time period, and $x_n$ is a function of one or more types of channel condition data provided by the wireless devices.

Each channel condition value of the map data may be expressed as a single value that characterizes the suitability of a particular channel for communication during a time period within a geographical location (e.g., a zone). An example process for generating the channel map data and providing it for graphical display is described with respect to FIG. 4. Example channel map data is shown in FIG. 5 and examples of how channel condition map data may be graphically displayed are shown with respect to FIGS. 6 and 7. An example process for updating channel map data is described with respect to FIG. 8.

Figure 4:
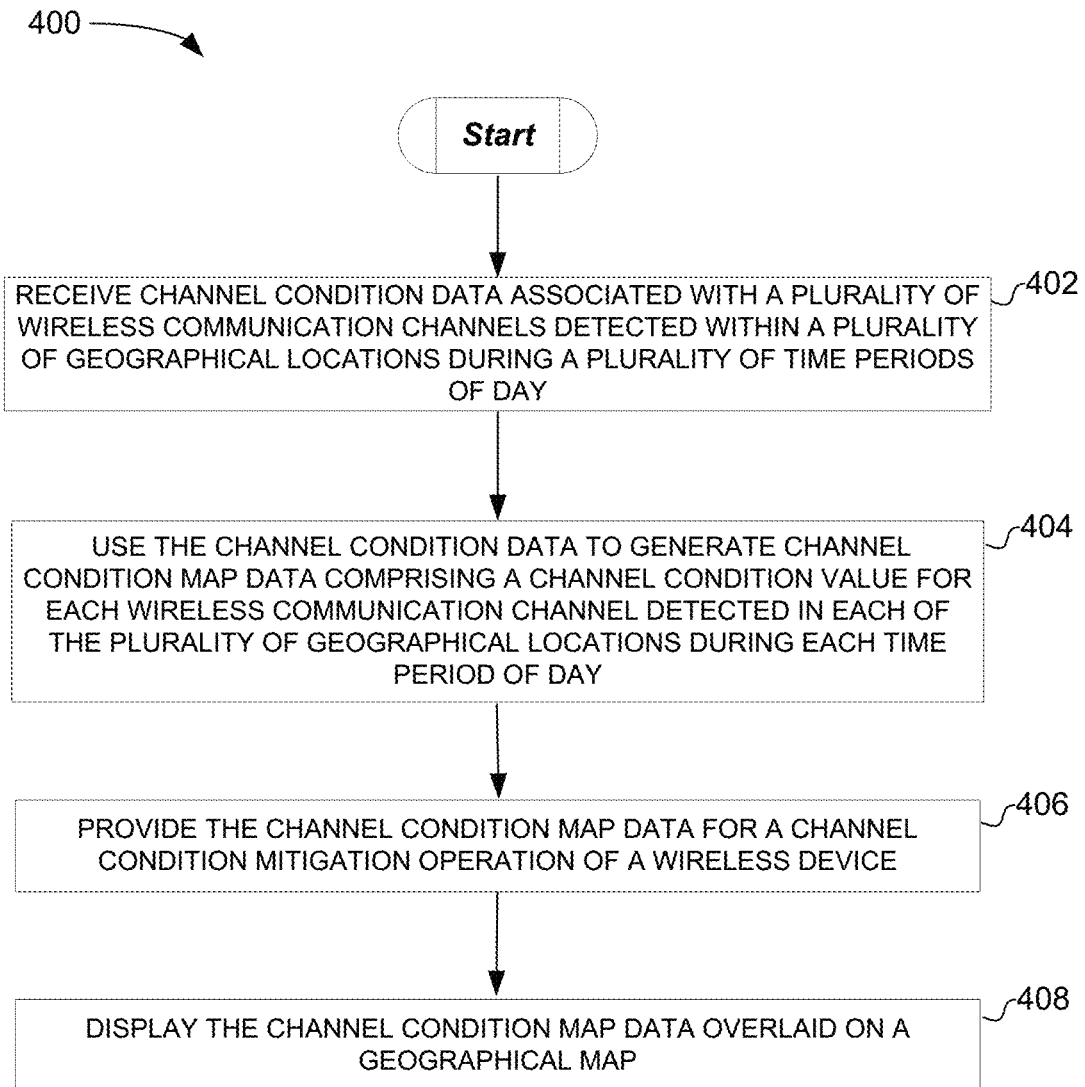
FIG. 4 is a flow diagram illustrating a method of generating channel map data, in accordance with embodiments.

FIG. 4 is a flow diagram illustrating a method of generating channel map data, in accordance with embodiments. The method 400 can be performed by processing logic comprising hardware (circuitry, dedicated logic, etc.), software (such as is run on a general-purpose computing system or a dedicated machine), firmware (embedded software), or any combination thereof. In various embodiments, the method 400 may be performed as shown and described with respect to the electronic device 302 of FIG. 3.

At block 402 the electronic device 302 receives channel condition data associated with a plurality of wireless communication channels detected within a plurality of geographical locations during a plurality of time periods of day. For example, at T1, the wireless camera 110 and the access point 112 detect Wi-Fi channels in Z1 120 and send the channel condition data associated with those Wi-Fi channel to the electronic device 302. During the same period (e.g., T1), the mobile phone 116 and the automobile 102 detect Wi-Fi channels in Z3 140 and send the channel condition data associated with those Wi-Fi channels to the electronic device 302. By T2, the automobile 102 has moved into Z1 120 and the laptop computer 115 has established a network connection. So at T2, the wireless camera 110, the access point 112, and the automobile 102 detect Wi-Fi channels in Z1 120 and send the channel condition data associated with those Wi-Fi channels to the electronic device 302. During the same period (e.g., T2), the mobile phone 116 and the laptop computer 115 detect Wi-Fi channels in Z3 140 and send the channel condition data associated with those Wi-Fi channels to the electronic device 302. Although a small set of wireless devices are referred to in this example, the number of wireless devices contributing channel condition data is may only be limited by design choice.

At block 404, the channel map data generator 304 uses the channel condition data to generate channel map data comprising a channel condition value for each wireless communication channel detected in each geographical location. FIG. 5 is a chart diagram showing a channel condition value per channel in column 506 for each geographical location in column 502 (e.g., Z1, Z2, Z3, and Z4) during each time period of day in column 504 (e.g., 4-8 am, 8-12 pm, 12-4 pm, 4-8 pm, 8-12 am, and 12-4 am). In an embodiment, each channel condition value is a scaled and/or normalized output of Equation (1) calculated by the channel map data generator 304 for the corresponding geographical location, time period of day, and channel. Each channel condition value is shown to be between zero and five, with zero indicting a highest level of suitability for communication on a channel and five indicating a lowest level of suitability for communication on a channel. Other ranges or representations of channel condition values may be used without departing from the claimed subject matter.

At block 406, the electronic device 302 provides the channel map data for a channel operation of a wireless device. One or more of the wireless devices may use the condition values in the channel map as a prediction of harmful channel conditions in a geographical location at a particular time and take appropriate action to mitigate the harm. Thus, a wireless devices' channel selection operations may be based on the channel condition values.

Figure 6:
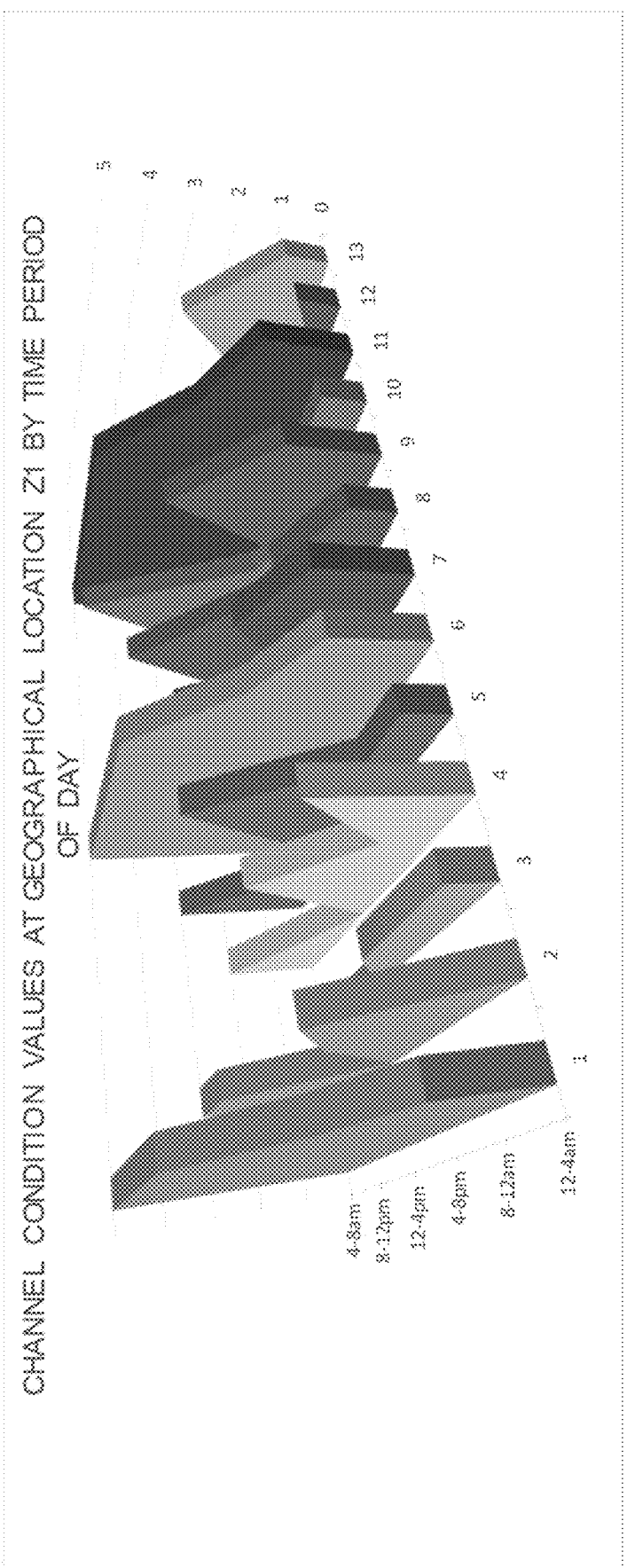
FIG. 6 is a chart diagram graphically representing predictive channel map data for different time periods of day, in accordance with embodiments.
Figure 7:
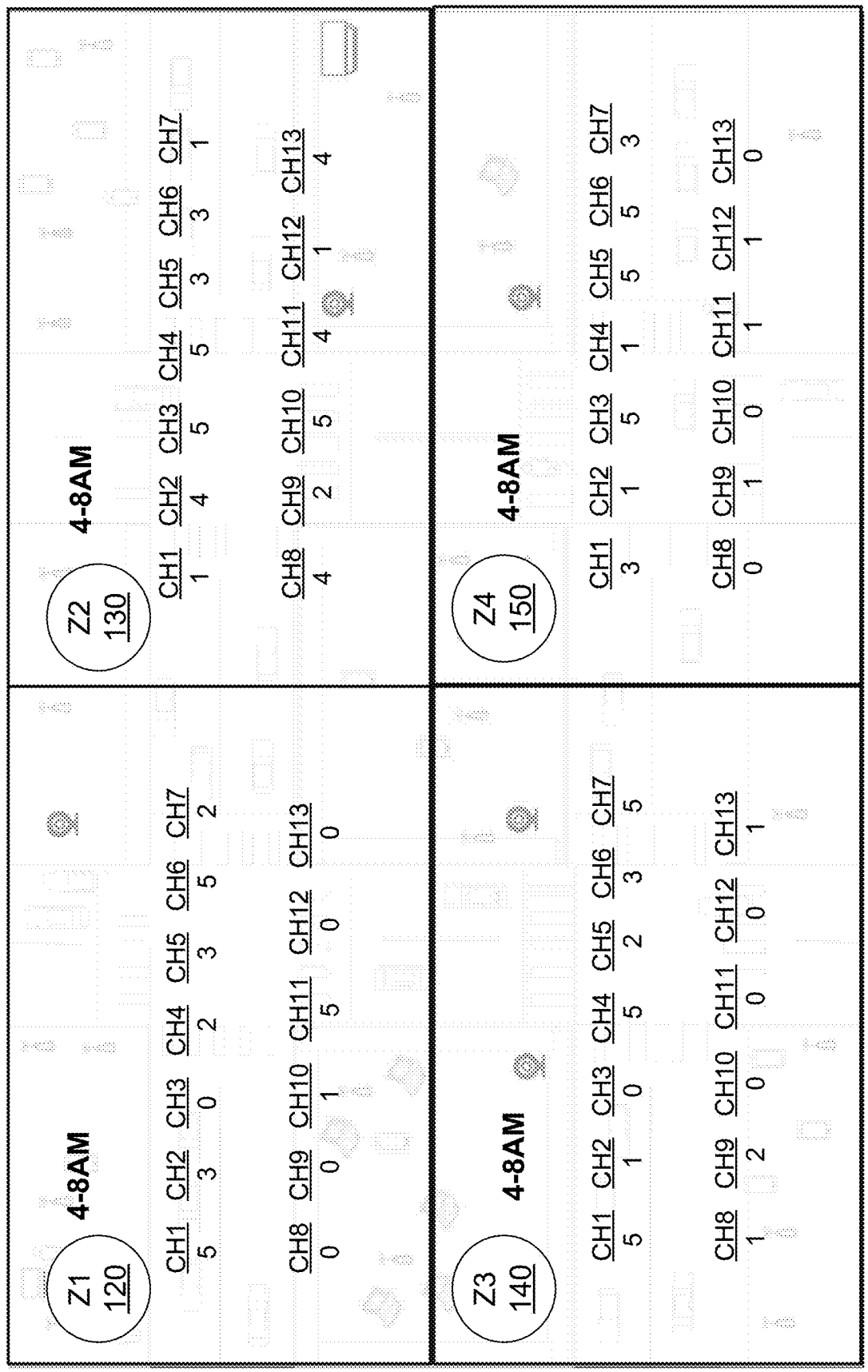
FIG. 7 is a map diagram illustrating channel map data overlaid on a geographical map, in accordance with embodiments.

At block, 408, the electronic device 302 may display all or a portion of the channel map data. Alternatively or additionally, one or more of the wireless devices may display the channel map data. Example graphical displays of the channel map data are shown in FIGS. 6 and 7. FIG. 6 is a chart diagram graphically representing the predictive channel map data of FIG. 5 for Z1 120 during the different time periods of day. FIG. 7 is a map diagram illustrating channel map data of FIG. 5 overlaid on a geographical map and represents a snapshot of channel condition values predicted for Z1 120, Z2 130, Z3 140, and Z4 150 during the 4 am to 8 am time period. Any other graphical representation of the channel map data (e.g., heat maps or topographical maps) may be used in other embodiments. In embodiments, a human user or an application may use the channel map data (e.g., of FIG. 5) or its graphical representation to preemptively avoid or mitigate harmful predicted channel conditions.

Figure 8:
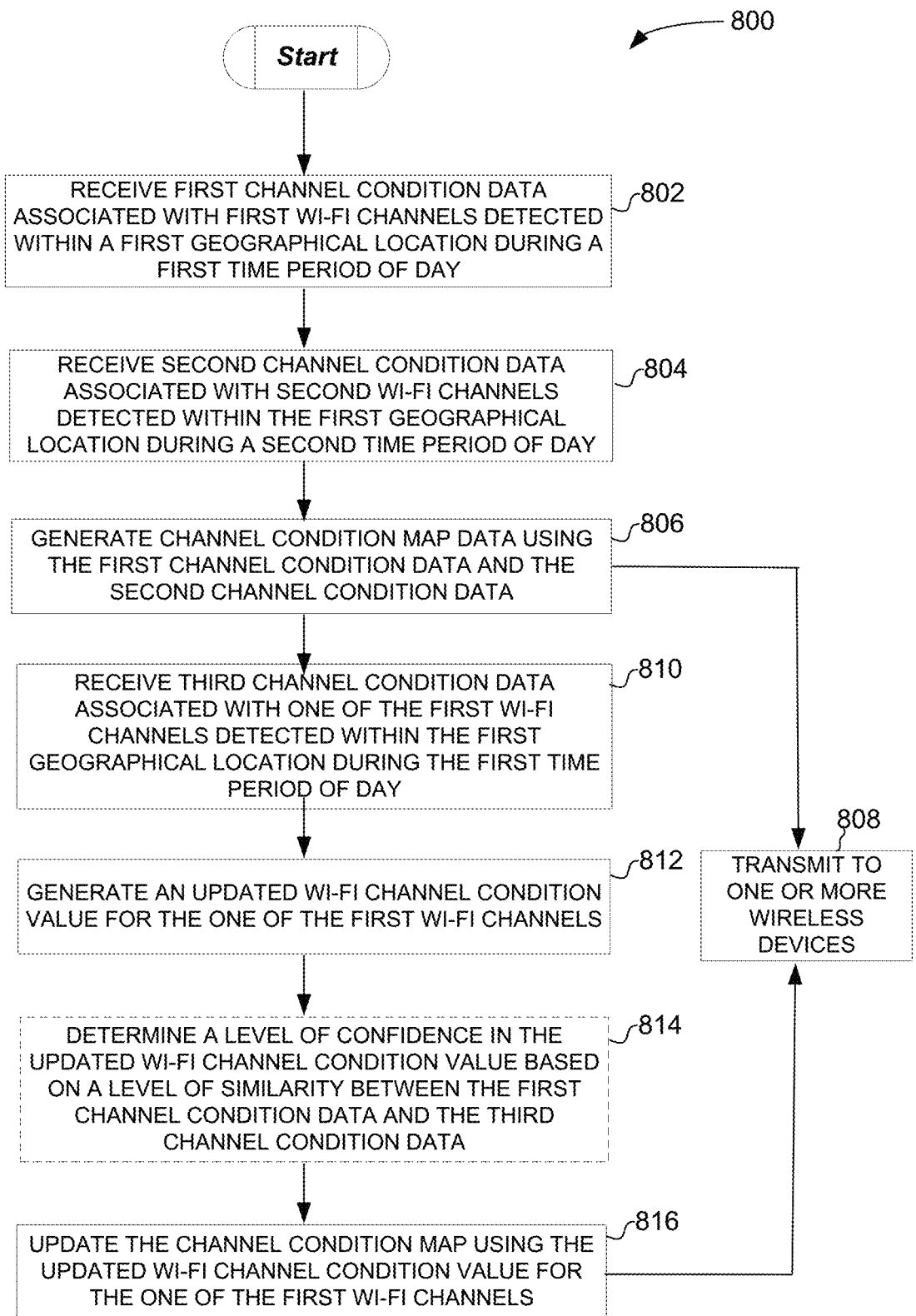
FIG. 8 is a flow diagram illustrating a method of generating and updating channel map data, in accordance with embodiments.

FIG. 8 is a flow diagram illustrating a method of generating and updating channel map data, in accordance with embodiments. The method 800 can be performed by processing logic comprising hardware (circuitry, dedicated logic, etc.), software (such as is run on a general-purpose computing system or a dedicated machine), firmware (embedded software), or any combination thereof. In various embodiments, the method 800 may be performed as shown and described with respect to FIGS. 3 and 4.

Blocks 802-808 relate to building initial channel map data for a geographical location corresponding to two different time periods and then distributing the map to wireless devices. Thus, at block 802 the electronic device 302 receives first channel condition data associated with first Wi-Fi channels detected within a first geographical (e.g., Z1 120) location during a first time period of day (e.g., 4-8 am on day 1). At block 804 the electronic device 302 receives second channel condition data associated with second Wi-Fi channels detected within the first geographical location (e.g., Z1 120) during a second time period of day (e.g., 8-12 pm on day 1). At block 806 the channel map data generator 304 generates channel map data using the first channel condition data and the second channel condition data. The channel map data may include a first channel condition value for each of the first Wi-Fi channels detected within the first geographical location during the first time period of day (e.g., 4-8 am on day 1) and a second channel condition value for each of the second Wi-Fi channels detected within the first geographical location (e.g., Z1 120) during the second time period of day (e.g., 8-12 pm on day 1). At block 808 the electronic device 302 transmits the initial channel map to one or more wireless devices.

Blocks 810-816 relate to generating updated channel condition values as new channel condition data comes in from wireless devices (e.g., during the same time period but on a subsequent day) in the same geographical location. At block 810 the electronic device 302 receives third channel condition data associated with a particular one of the first Wi-Fi channels (e.g., channel 1) detected within the first geographical location (e.g., Z1 120) during the first time period of day (e.g., 4-8 am on day 2). At block 812 the channel map data generator 304 generates an updated channel condition value for the particular one of the first Wi-Fi channels (e.g., channel 1). For example, the updated channel condition value may be based on new channel condition data corresponding to the same geographical location (e.g., Z1 120) and time period of day (e.g., 4-8 am) as was received the day before (e.g., on day 1).

At block 814 the channel map data generator 304 may optionally assign a level of confidence in the updated channel condition value based on a level of similarity between the first channel condition data (e.g., the previous channel condition data received on day 1) and the third channel condition data (e.g., the new channel condition data received on day 2). Alternatively or additionally a level of confidence in the updated channel condition value may be based on a level of similarity between the previously generated channel condition value and the newly generated channel condition value. For example, a channel condition value may be associated with a low level of confidence when channel condition data or values vary beyond a predetermined number of standard deviations. The channel condition value may be associated with increasingly higher levels of confidence as the channel condition data or values converge over time.

At block 816 the channel map data generator 304 then updates the channel map using the updated channel condition value for the one of the first Wi-Fi channels (e.g., channel 1) and the electronic device 302 transmits the updated channel map at block 808.

Figure 9:
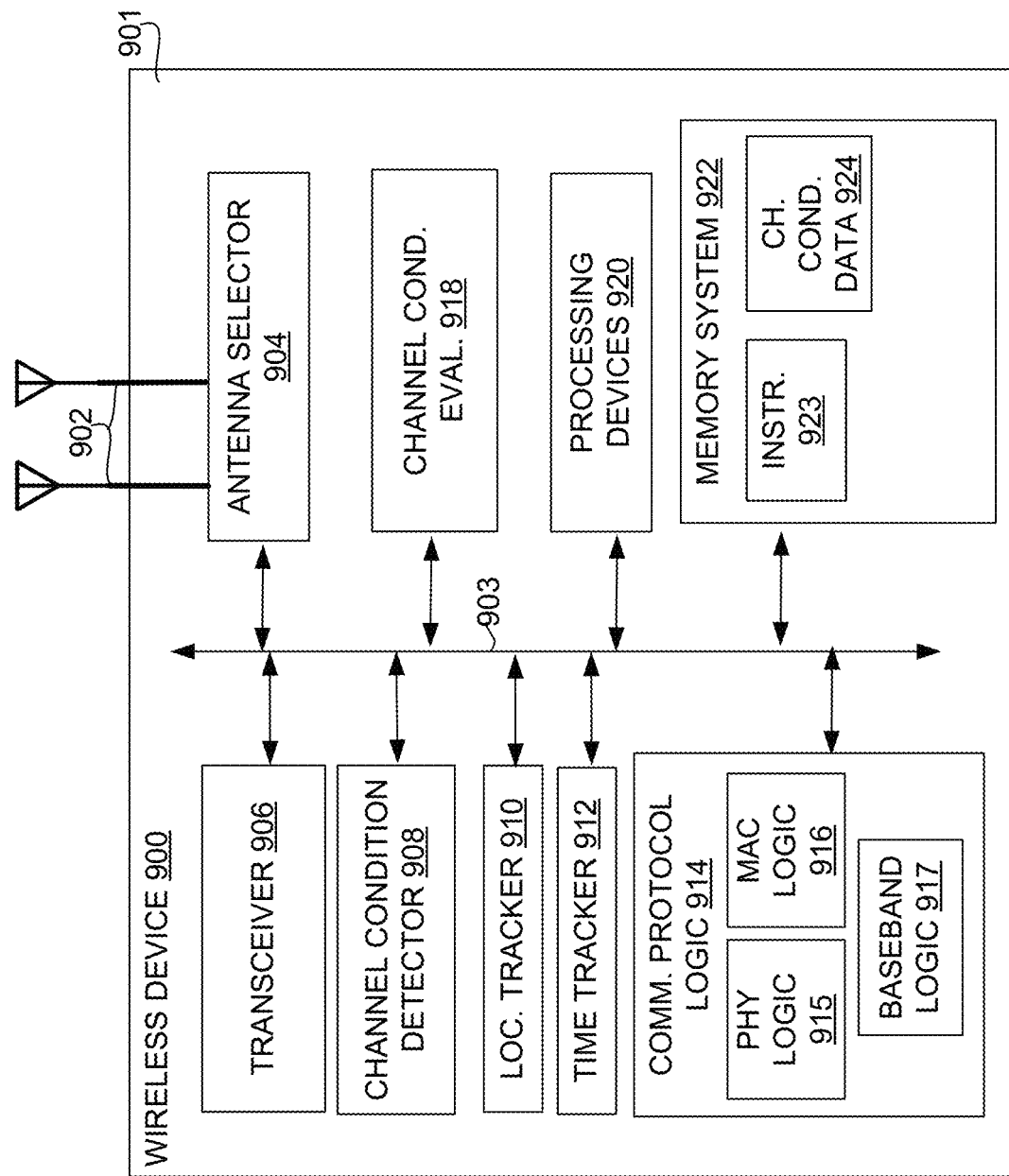
FIG. 9 is a block diagram illustrating a wireless device, in accordance with an embodiment.

FIG. 9 is a block diagram illustrating a wireless device, in accordance with an embodiment. The wireless device 900 may be included in any of the wireless devices shown or described with respect to FIGS. 1-8. The wireless device 900 may be disposed on a substrate 901 such as a printed circuit board (PCB). The bus system 903 may include inter-chip busses, intra-chip busses, coexistence busses, or any other communication line to connect the circuits and/or logic blocks, which may be disposed on an IC chip or discrete IC chips.

In embodiments, collaborative coexistence hardware mechanisms and algorithms enable communication subsystems to operate concurrently and/or simultaneously. For example, the wireless device 900 may be included on a system on a chip that includes BT communication resources and/or ZB communication resources coupled via coexistence interface(s) to WLAN communication resources.

Collaborative coexistence techniques provide a methodology by which communication resources for multiple communication protocols can be collocated on a device (e.g., a small form-factor device). Coexistence solutions can be implemented at the chip level, the board level, the software level (e.g., firmware), and/or through antennas. In an embodiment, collaborative coexistence between WLAN, BT, and/or ZB subsystems may be implemented by Packet Traffic Arbitration (PTA) logic (not shown) using PTA's prioritization approaches between data types and applications and/or other arbitration algorithms to pursue optimum performance for the particular circumstances and design constraints of a multi-network communication system. Through PTA embodiments, overall quality for simultaneous voice, video, and data transmission on an embedded system can be achieved. In some embodiments, channel conditions predicted according to the embodiments described herein may be shared as part of a coexistence operation for communication by one or more of the multiple communication resources supported by the wireless device 900.

The wireless device 900 is shown to include transceiver 906, channel condition detector 908, location tracker 910, time tracker 912, communication protocol logic 914, antenna selector 904, channel condition evaluator 918, processing devices 920, and memory systems 922, which are each discussed in more detail below.

Wireless device 900 may include or be coupled to antennas 902 through antenna selector 904, which may include any selection logic (e.g., hardware, software, or combination) known in the art. When the antenna selector 904 selects an antenna, it couples the antenna to the transceiver 906 for RF signal reception and transmission. In embodiments, each antenna 902 can represent one or more antennas. For example, in some embodiments, the antenna selector 904 (e.g., operating as switch circuitry) may couple the wireless device 900 to one or more antenna arrays (e.g., a phased array) and/or antenna clusters including any number of antennae (e.g., six or eight) exclusively paired with or shared among communication protocol logic 914.

The transceiver 906 may be coupled with one or more of antennas 902 via antenna selector 904 and facilitates transmitting and receiving RF signals according to one or more communication protocols. In embodiments, when operating as a receiver, the transceiver 906 processes received RF signals in the analog domain, digitizes them, and demodulates corresponding digital data to provide a decoded sequence of 1s and 0s to the communication protocol logic 914 for further processing (e.g., packet processing). When operating as a transmitter, the transceiver 906 generally performs the operations in reverse, receiving a sequence of 1s and 0s from the communication protocol logic 914, modulating the signal, and outputting an analog signal for transmission by one or more of the antennas 902.

Location tracker 910 and time tracker 912 are to track the geographical locations and time values associated with the wireless device 900 for association with channel condition data detected by the channel condition detector 908. In embodiments, location tracker 910 includes a global positioning system circuitry (not shown) to detect GPS coordinates. Alternatively or additionally, location tracker 910 may use triangulation techniques based on signals from access points or other location finding techniques known in the art to determine location of the wireless device 900. Time tracker 912 may, for example, utilize a system clock circuitry to track time or access remotely generated time values.

The channel condition detector 908 is to detect, calculate, access, and/or otherwise provide geo-tagged and time-stamped channel condition data for channel condition mapping. In embodiments, the channel condition detector 908 may be triggered to provide the channel condition data by various events or conditions. Such events or conditions may be received from the electronic device 302 of FIG. 3 and stored as an array in the memory system 922. For example, the channel condition detector 908 may begin to detect and store channel condition data in response to proximity of the wireless device 900 to a particular geographical location, a detected level of congestion or interference, and/or a particular time of day. In some embodiments, the channel condition detector 908 may include analog and/or digital logic and/or measurement circuitry to determine attributes associated with communication channels. In embodiments, the channel condition detector 908 may obtain channel condition data by listening to or scanning RF signals and/or sniffing packets broadcast on channels. Channel condition detector 908 may also sniff and/or count packets being communicated on a channel to obtain channel condition data. Although shown as being a separate block, the channel condition detector 908 may be implemented in whole or in part by the transceiver 906, communication protocol logic 914, the channel condition evaluator 918, and/or by processing instructions 923 stored in the memory system 922.

Channel condition data may include, without limitation, signal level and/or strength values (e.g., RSSI value), signal quality values (e.g., SNR or an exponential effective SNR mapping (EESM) value), signal-to-interference-plus-noise ratio (SINR), packet delivery ratio (PDR), number of packets, transmit opportunity, security levels, service set identifiers, channel identifiers, device identifiers, bit error rate (BER) and/or any other attribute combinations or derivatives thereof. SINR represents the extent to which the power of a received signal exceeds the sum of noise plus interference at a transceiver. PDR is the ratio of the correctly received packets at the receiver to the total number of packets sent by the sender. BER is the ratio of bits with errors to the total number of bits that have been received over a given time period. In embodiments, a model may be used to map the SINR to the BER or the PER in presence, for example, of white noise or fading. One or more of these attributes may provide an average estimation of channel conditions over a period of time. The channel condition detector 908 may store the detected channel condition data in raw and/or aggregated form (e.g., in a channel condition table 924) in the memory system 922 for later use in channel map generation.

The channel condition detector 908 may aggregate the channel condition data on a per channel basis, based on the following expression:

$$\sum_{s=1}^{s_{end}} \int_{t=0}^{t_{end}} x_n(t)dt \qquad (2)$$

where s=1 is a first sample of channel condition data and $s_{end}$ is a last sample of channel condition data, t=0 is a start of a time period and $t_{end}$ is the end of the time period, and $x_n$ is a function of one or more types of channel condition data detected by the channel congestion detector.

The communication protocol logic 914 includes the instructions and hardware to support communication protocols defined by one or more communication protocol standards (e.g., according to WLAN, BT, LTE, and/or ZB communication protocols). The PHY logic 915 may include dedicated circuitry and/or processor executed instructions to implement all or portions of electrical and physical specifications of a communication protocol and defines the relationship between the wireless device and the transmission medium (e.g., all or portions of the physical layer of the OSI reference model). For example, the PHY logic 915 may establish and terminate connections, provide contention resolution and flow control, and provide modulation, demodulation, and/or conversion between digital data and corresponding wirelessly communicated signals. The MAC logic 916 may include dedicated circuitry and/or processor executed instructions (e.g., control logic) to implement all or portions of the functional and procedural means to transfer data between network entities (e.g., all or portions of the data link layer of the OSI reference model). The MAC logic 916 may inspect frames fields for ACK indications to detect and possibly correct errors that may occur in the physical layer.

Alternatively or additionally, the communication protocol logic 914 may include baseband logic 917 that includes dedicated circuitry and/or processor executed instructions to manage physical channels and links and other services like error correction, data whitening, hop selection and security according to BT communication protocol standards. The baseband logic 917 may include a link controller that works with a BT link manager (not shown) in upper BT protocol layers to carry out link level routines like link connection and power control. The baseband logic 917 may also manage asynchronous and synchronous links, handle packets and do paging and inquiry to access and inquire BT devices in the area.

In embodiments, the processing devices 920 are used to implement wireless device 900 operations utilizing instructions 923 (e.g., firmware or microcode) and/or data structures organized within the memory system 922. Although shown as single blocks, processing devices 920 and memory systems 922 may include multiple shared or dedicated resources distributed among the various blocks (e.g., 904, 908, 910, 912, 914, 918) of the wireless device 900. Example processing devices 920 and memory systems 922 are described in more detail with respect to FIG. 11.

The channel condition evaluator 918 is to make a channel selection and/or cause the antenna selector 904 to make an antenna selection based on channel map data stored in the memory system 922. The channel condition evaluator 918 may be implemented by dedicated hardware and/or by processing instructions 923. For some embodiments, the channel condition evaluator 918 or the channel condition detector 908 may generate the congestion map data (e.g., using Equation 2). In another embodiment, the congestion map data is provided to the memory system 922 by the electronic device 302 of FIG. 3.

In embodiments, the channel condition evaluator 918 may base channel selection and or antenna selection on selection algorithms designed to meet signal quality targets, minimize co-channel interference, minimize overlapping channel interference, and/or minimize channel congestion. In embodiments, selection is based on comparing predicted channel condition values associated with a currently selected channel with a reference channel condition value (e.g., a threshold value) or a predicted channel condition value for a currently unselected channel. Example operations of the channel condition evaluator 918 are described in more detail with respect to FIG. 10.

Figure 10:
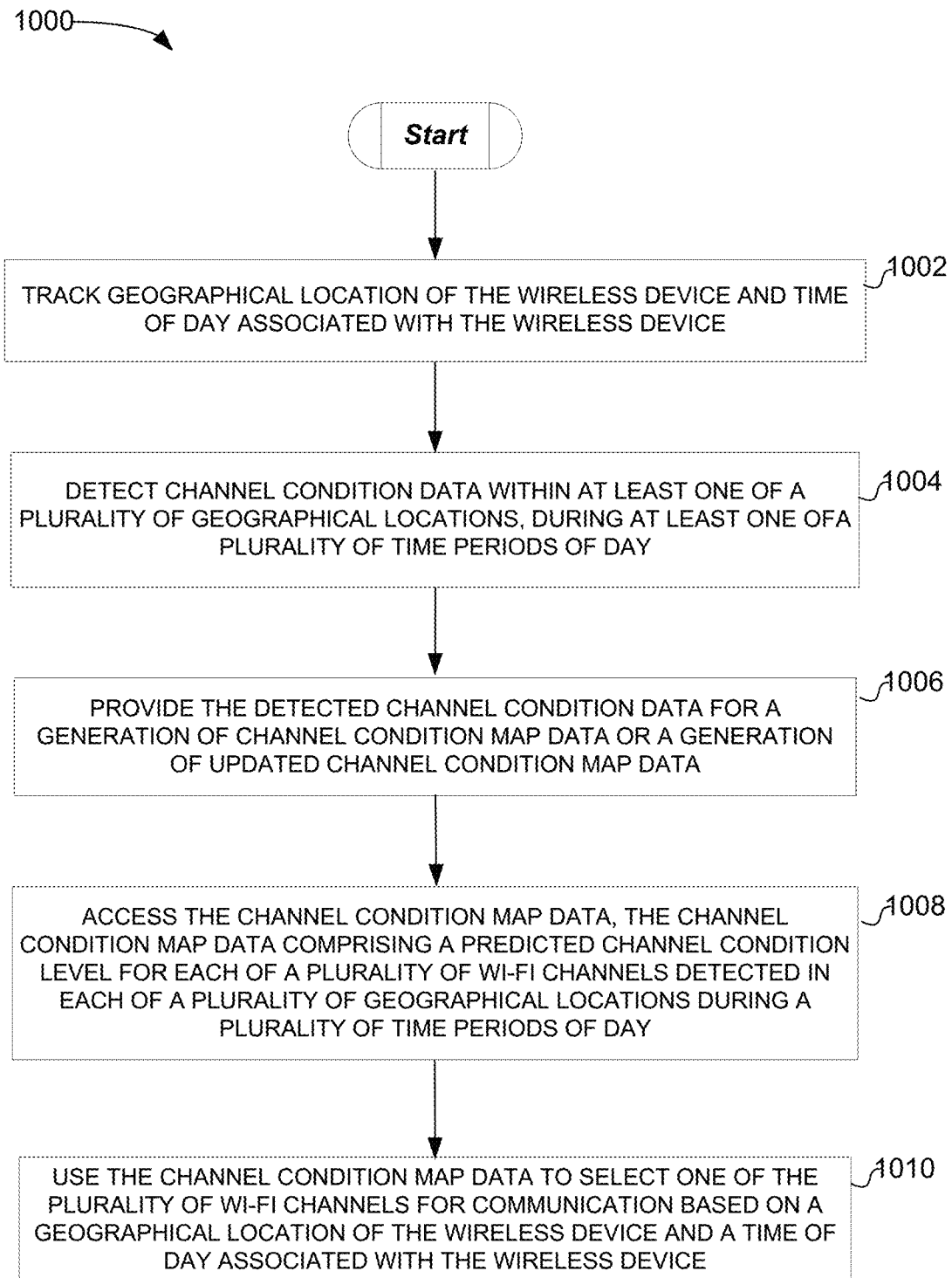
FIG. 10 is a flow diagram illustrating a method of providing channel condition data and using channel map data, in accordance with embodiments.

FIG. 10 is a flow diagram illustrating a method of providing channel condition data and using channel map data, in accordance with embodiments. The method 1000 can be performed by processing logic comprising hardware (circuitry, dedicated logic, etc.), software (such as is run on a general-purpose computing system or a dedicated machine), firmware (embedded software), or any combination thereof. In various embodiments, the method 1000 may be performed by the wireless device 800 as shown and described with respect to FIG. 8.

At block 1002, the location tracker 910 tracks geographical location of the wireless device 900 and the time tracker 912 tracks the time of day associated with the wireless device 900.

At block 1004 the channel condition detector 908 detects channel condition data within at least one of a plurality of geographical locations (e.g., Z1 120) during at least one of a plurality of time periods of day (e.g., 4-8 am). In some embodiments, the channel condition detector 908 may not detect and/or may not store the channel condition data until certain location, time of day, and/or channel criteria is met. Such criteria may be stored in the memory system 922 and/or provided as a data array by a remote device (e.g., the electronic device 302 of FIG. 3). For example the channel condition detector 908 may detect and/or store the channel condition data responsive to determining that the wireless device 900 is within a particular geographical location, operating during a particular time of day, or experiencing a threshold level of congestion or interference, or based on detecting any other triggering conditions. The channel condition detector 908 may aggregate channel condition data that corresponds to the same channel, geographical location, and time period as described above with respect to Equation (2).

At block 1006, the channel condition detector 908 provides the detected channel condition data for a generation of channel map data or a generation of updated channel map data. In one embodiment, the channel condition evaluator 918 may utilize Equation (1) or Equation (2) to generate the channel map data locally on the wireless device. Alternatively or additionally, the wireless device 900 may transmit the channel condition data to a remote device (e.g., the electronic device 302 of FIG. 3) via a WLAN (e.g., Wi-Fi) or a cellular network (e.g., LTE) to generate the channel map data. Some embodiments schedule such transmissions so as to not worsen channel congestion. For example, the wireless device may verify that a communication channel is clear (and not congested) prior to transmission. Alternatively or additionally, the wireless device 900 may transmit the detected channel condition data based on an amount of available memory capacity of the wireless device 900.

At block 1008 the channel condition evaluator 918 accesses channel map data that predicts a channel condition for each of a plurality of Wi-Fi channels in each of a plurality of geographical location during a plurality of time periods of day. For example, the channel condition evaluator 918 may receive the channel map data from a remote computer. In some embodiments, the channel condition evaluator 918 may access the channel map data responsive to determining that a channel interference or channel congestion of the channel currently being used for communication exceeds a threshold level of channel interference or channel congestion.

At block 1010 the channel condition evaluator 918 uses the channel map data to select one of the plurality of Wi-Fi channels (e.g., or antennas) for communication based on a geographical location of the wireless device and a time of day associated with the wireless device.

For example, the channel condition evaluator 918 may switch from using a first Wi-Fi channel for communication to using a second Wi-Fi channel for communication prior to entering a geographical location if the predicted channel condition value of the first Wi-Fi channel within the geographical location is greater than a predicted channel condition value of the second Wi-Fi channel within the geographical location. When wireless device is part of a mobile network (e.g., an automobile use case), the timing of switching channels prior to entering the geographical location may be based on a speed of the wireless device. In embodiments, switching to the second Wi-Fi channel comprises determining that the second predicted channel condition value is less than a threshold channel condition level (e.g., to verify that the second channel is suitable for communication).

The selected channel may be channel that is currently being utilized or a new channel. In some embodiments, the channel condition evaluator 918 may adjust a transmit power used to transmit data via the selected one of the plurality of Wi-Fi channels. Alternatively or additionally, the channel condition evaluator 918 may vary or switch the channel width to be used for communication or in some cases the frequency band to be used for communication (e.g., from using channels in the 2.4 GHz frequency band to using channels in the 5 GHz frequency band).

Embodiments described herein collect channel condition data corresponding to various geographical locations and times. A cloud-based system may generate the channel map data using channel condition data crowdsourced by hundreds or thousands of wireless devices or a wireless device may build its own channel map data with or without the benefit of crowdsourcing. The channel map data includes channel condition values that predict channel conditions for geographical locations at different time periods of day. In embodiments, one or more wireless devices can access the channel map data to avoid or mitigate against harmful channel conditions predicted by the channel map data for a location and time. An electronic device that may fully or partially include and/or operate the example embodiments of the electronic device 302 of FIG. 3 and/or the wireless device 900 of FIG. 9 is now described with respect to FIG. 11.

Figure 11:
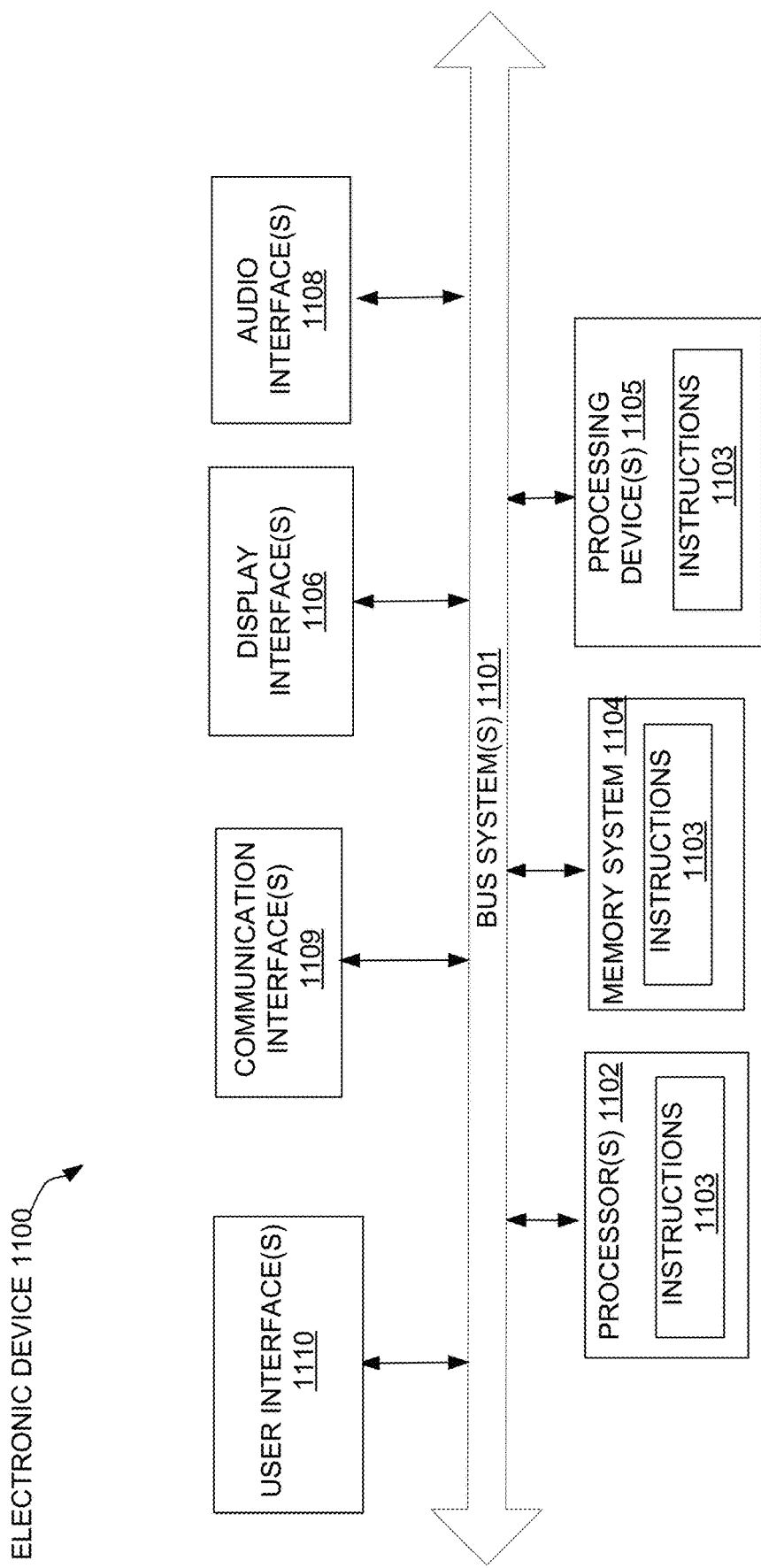
FIG. 11 is a block diagram illustrating an electronic device, in accordance with embodiments.

FIG. 11 is a block diagram illustrating an electronic device 1100, in accordance with embodiments. The electronic device 1100 may be in the form of a computer system within which sets of instructions may be executed to cause the electronic device 1100 to perform any one or more of the methodologies discussed herein. The electronic device 1100 may operate as a standalone device or may be connected (e.g., networked) to other machines. In a networked deployment, the electronic device 1100 may operate in the capacity of a server or a client machine in server-client network environment, or as a peer machine in a P2P (or distributed) network environment.

The electronic device 1100 may be an Internet of Things (IoT) device, a server computer, a client computer, a personal computer (PC), a tablet, a set-top box (STB), a VCH, a Personal Digital Assistant (PDA), a mobile telephone, a web appliance, a network router, switch or bridge, a television, speakers, a remote control, a monitor, a handheld multi-media device, a handheld video player, a handheld gaming device, or a control panel, or any other machine capable of executing a set of instructions (sequential or otherwise) that specify actions to be taken by that machine. Further, while only a single electronic device 1100 is illustrated, the term "device" shall also be taken to include any collection of machines that individually or jointly execute a set (or multiple sets) of instructions to perform any one or more of the methodologies discussed herein.

The electronic device 1100 is shown to include processor(s) 1102. In embodiments, the electronic device 1100 and/or processors(s) 1102 may include processing device(s) 1105 such as a System on a Chip processing device, developed by Cypress Semiconductor Corporation, San Jose, Calif. Alternatively, the electronic device 1100 may include one or more other processing devices known by those of ordinary skill in the art, such as a microprocessor or central processing unit, an application processor, a host controller, a controller, special-purpose processor, DSP, an application specific integrated circuit (ASIC), a field programmable gate array (FPGA), or the like. Bus system 1101 may include a communication block (not shown) to communicate with an internal or external component, such as an embedded controller or an application processor, via communication device(s) 1109 and/or bus system 1101.

Components of the electronic device 1100 may reside on a common carrier substrate such as, for example, an IC die substrate, a multi-chip module substrate, or the like. Alternatively, components of the electronic device 1100 may be one or more separate ICs and/or discrete components.

The memory system 1104 may include volatile memory and/or non-volatile memory which may communicate with one another via the bus system 1101. The memory system 1104 may include, for example, random access memory (RAM) and program flash. RAM may be static RAM (SRAM), and program flash may be a non-volatile storage, which may be used to store firmware (e.g., control algorithms executable by processor(s) 1102 to implement operations described herein). The memory system 1104 may include instructions 1103 that when executed perform the methods described herein. Portions of the memory system 1104 may be dynamically allocated to provide caching, buffering, and/or other memory based functionalities.

The memory system 1104 may include a drive unit providing a machine-readable medium on which may be stored one or more sets of instructions 1103 (e.g., software) embodying any one or more of the methodologies or functions described herein. The instructions 1103 may also reside, completely or at least partially, within the other memory devices of the memory system 1104 and/or within the processor(s) 1102 during execution thereof by the electronic device 1100, which in some embodiments, constitutes machine-readable media. The instructions 1103 may further be transmitted or received over a network via the communication device(s) 1109.

While a machine-readable medium is in some embodiments a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing or encoding a set of instructions for execution by the machine and that cause the machine to perform any one or more of the example operations described herein. The term "machine-readable medium" shall accordingly be taken to include, but not be limited to, solid-state memories, and optical and magnetic media.

The electronic device 1100 is further shown to include display interface(s) 1106 (e.g., a liquid crystal display (LCD), touchscreen, a cathode ray tube (CRT), and software and hardware support for display technologies), audio interface(s) 1108 (e.g., microphones, speakers and software and hardware support for microphone input/output and speaker input/output). The electronic device 1100 is also shown to include user interface(s) 1110 (e.g., keyboard, buttons, switches, touchpad, touchscreens, and software and hardware support for user interfaces).

The above description is intended to be illustrative, and not restrictive. For example, the above-described embodiments (or one or more aspects thereof) may be used in combination with each other. Other embodiments will be apparent to those of skill in the art upon reviewing the above description. In this document, the terms "a" or "an" are used, as is common in patent documents, to include one or more than one. In this document, the term "or" is used to refer to a nonexclusive or, such that "A or B" includes "A but not B," "B but not A," and "A and B," unless otherwise indicated. In the event of inconsistent usages between this document and those documents so incorporated by reference, the usage in the incorporated reference(s) should be considered supplementary to that of this document; for irreconcilable inconsistencies, the usage in this document supersedes the usage in any incorporated references.

Although the claimed subject matter has been described with reference to specific embodiments, it will be evident that various modifications and changes may be made to these embodiments without departing from the broader spirit and scope of what is claimed. Accordingly, the specification and drawings are to be regarded in an illustrative rather than a restrictive sense. The scope of the claims should be determined with reference to the appended claims, along with the full scope of equivalents to which such claims are entitled. In the appended claims, the terms "including" and "in which" are used as the plain-English equivalents of the respective terms "comprising" and "wherein." Also, in the following claims, the terms "including" and "comprising" are open-ended; a system, device, article, or process that includes elements in addition to those listed after such a term in a claim are still deemed to fall within the scope of that claim. Moreover, in the following claims, the terms "first," "second," and "third," etc. are used merely as labels and are not intended to impose numerical requirements on their objects.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims.

What is claimed is:

1. A method of a wireless device, comprising:
    tracking geographical locations of the wireless device and time associated with the wireless device;
    accessing channel map data comprising a predicted channel condition value for each of a plurality of Wi-Fi channels within each of a plurality of geographical locations during a plurality of time periods of day; and
    using the channel map data, selecting one of the plurality of Wi-Fi channels for communication based on a geographical location of the wireless device and a time of day associated with the wireless device, wherein the selecting of the one of the plurality of Wi-Fi channels comprises using the channel map data, determining that a first predicted condition value of a first Wi-Fi channel within a first geographical location during a first time period of day is greater than a second predicted condition value of a second Wi-Fi channel within the first geographical location during the first time period of day, and responsive to the determination, switching from using the first Wi-Fi channel for communication to using a second Wi-Fi channel for communication, wherein the switching from using the first Wi-Fi channel for communication to using the second Wi-Fi channel for communication is initiated prior to entering the first geographical location.

2. The method of claim 1, wherein the accessing of the channel map data comprises receiving the channel map data from a remote computer, wherein the channel map data is based on channel condition data crowdsourced by a plurality of devices.

3. The method of claim 1 further comprising:
    detecting channel condition data associated with at least one of the plurality of Wi-Fi channels, within at least one of the plurality of geographical locations, during at least one of the plurality of time periods of day; and
    providing the detected channel condition data for a generation of the channel map data or a generation of updated channel map data.

4. The method of claim 3, wherein the detecting of the channel condition data associated with the at least one of the plurality of the Wi-Fi channels comprises detecting at least one of a received signal strength indicator, a signal-to-noise ratio value, a transmit opportunity value, and a packet loss value.

5. The method of claim 3, wherein the detecting of the channel condition data comprises detecting channel condition data reflecting channel utilization that is not in compliance with a communication protocol.

6. The method of claim 3, wherein the providing of the detected channel condition data comprises aggregating the detected channel condition data detected during the at least one of the plurality of time periods of day.

7. The method of claim 3, wherein the detecting of the channel condition data comprises determining that the wireless device is within a first geographical location and storing the channel condition data for the at least one of the plurality of Wi-Fi channels in a memory responsive to the determination.

8. The method of claim 3, wherein the detecting of the channel condition data comprises determining that the wireless device is operating at a first time of day and storing the channel condition data for the at least one of the plurality of Wi-Fi channels in a memory responsive to the determination.

9. The method of claim 3, wherein the detecting of the channel condition data comprises determining that a condition value associated with the at least one of the plurality of Wi-Fi channels meets or exceeds a threshold condition level and storing the channel condition data for the at least one of the plurality of Wi-Fi channels in a memory responsive to the determination.

10. The method of claim 3, wherein the providing the detected channel condition data comprises transmitting the detected channel condition data to a remote computer via a wireless local area network or a cellular network.

11. The method of claim 1, further comprising determining a speed of the wireless device, wherein the selecting of the one of the plurality of Wi-Fi channels for communication is initiated based on the determined speed.

12. The method of claim 1, wherein the accessing of the channel map data comprises determining that a condition value of a first channel currently being used for communication meets or exceeds a threshold condition level and accessing the channel map data responsive to the determination.

13. The method of claim 1, wherein the selecting of the one of the plurality of Wi-Fi channels comprises selecting the one of the plurality of Wi-Fi channels for communication in an automotive network including the wireless device and at least one other wireless device.

14. The method of claim 1, wherein the determining that the first predicted condition value of the first Wi-Fi channel is greater than the second predicted condition value of the second Wi-Fi channel comprises determining that the second predicted condition value is less than a threshold condition level.

15. The method of claim 1, wherein the selecting the one of the plurality of Wi-Fi channels for communication comprises adjusting a transmit power used to transmit data via the selected one of the plurality of Wi-Fi channels.

16. The method of claim 1, wherein the selecting the one of the plurality of Wi-Fi channels for communication comprises switching from using a first Wi-Fi channel width for communication to using a second Wi-Fi channel width for communication.

* * * * *